Nov. 14, 1933.　　　　S. WANG　　　　1,935,381

PRODUCTION OF BISULPHITE LIQUOR AND COOLING CARBON DIOXIDE FORMED THEREIN

Filed March 6, 1933

INVENTOR:
SIGMUND WANG
BY　　　　ATTORNEY

Patented Nov. 14, 1933

1,935,381

UNITED STATES PATENT OFFICE 1,935,381

PRODUCTION OF BISULPHITE LIQUOR AND COOLING CARBON DIOXIDE FORMED THEREIN

Sigmund Wang, Hawkesbury, Ontario, Canada

Application March 6, 1933. Serial No. 659,876

6 Claims. (Cl. 23—130)

This invention relates to an improved method of producing bisulphite liquor and cooling the carbon dioxide formed therein preliminary to liquefaction or solidification of the latter.

The object of the invention is to effect economies in the production of these widely used products, whereby liquid sulphur dioxide, economically obtainable from smelter gases and the like, may be employed and brought into heat exchange relationship with carbon dioxide, released in the formation of bisulphite liquor, to cool the carbon dioxide preliminary to liquefaction or solidification.

Figure 1:
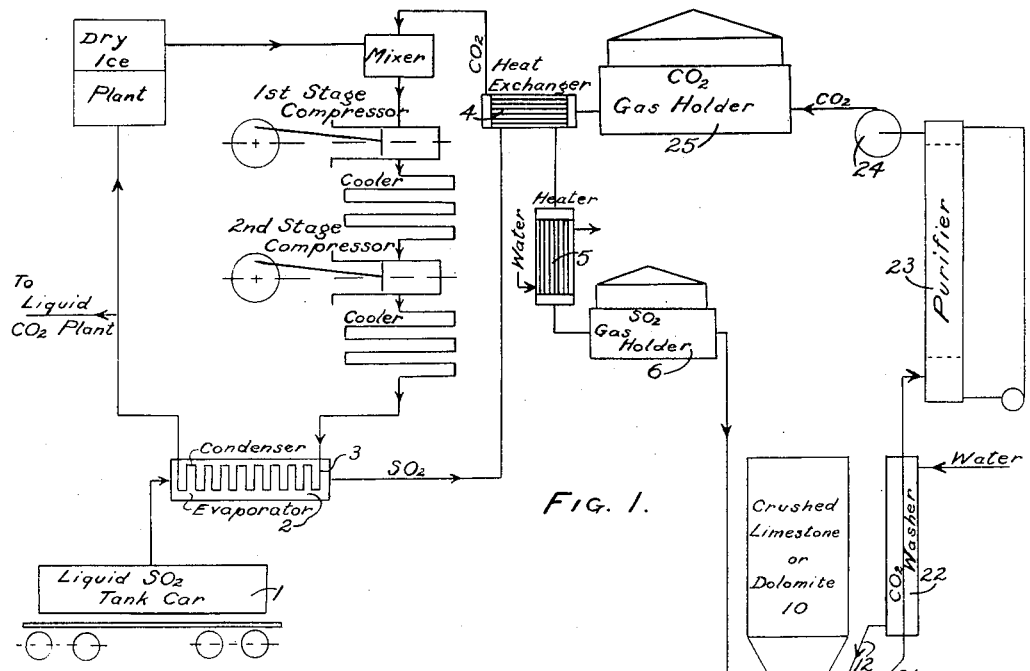
Figure 2:
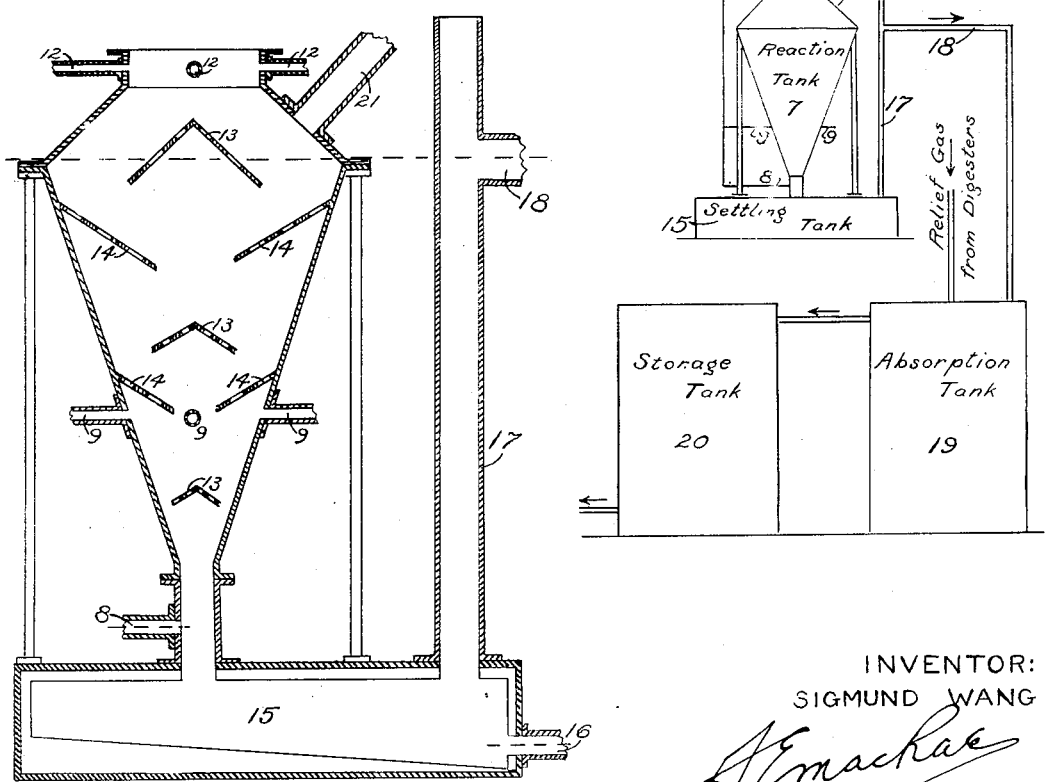

The invention will be described with reference to the accompanying drawing, in which Figure 1 diagrammatically represents a flow chart of the process, and Figure 2 is a sectional elevation of the reaction tank.

Liquid sulphur dioxide, as from a tank car 1, is led through an evaporator 2, having condenser coils or the like 3, to a heat exchanger 4 and preferably through a heater 5 to a gas holder 6, from which the gas is conveyed to a conical reaction tank 7, preferably entering the same at the points 8 and 9.

Powdered limestone or dolomite from storage 10 is fed through a mechanical distributor 11 to the top of the reaction tank where it meets water from the pipes 12, equivalent to the volume of raw acid desired. Within the reaction tank are located series of perforated baffles 13 and 14, through and around which the down-flowing liquid and rising gases pass. A settling tank 15 is arranged at the base of the tank and in communication therewith and has an outlet 16 for the discharge of impurities. A stand-pipe 17 communicates with the settling tank and has an overflow outlet 18 which maintains a constant liquor level in the reaction tank and leads to an absorption tank 19 which discharges into a storage tank 20. Relief gases from sulphite digesters may be admitted to the absorption tank as illustrated to recover $SO_2$ and strengthen the liquor.

The sulphur dioxide causes a reaction with the limestone forming bisulphite liquor and liberating carbon dioxide. The rising gases assist the baffles in creating turbulence in the liquor to maintain the limestone particles in suspension. Owing to the conical or tapered form of the reaction tank, the undecomposed limestone approaching the bottom of the tank is subjected to the action of the strongest acid and gas, thus insuring maximum decomposition of the carbonates and liberation of carbon dioxide with the consequent formation of liquor.

Carbon dioxide released in the reaction tank passes through the outlet 21 to a washer 22 in which traces of $SO_2$ are removed with water which enters the reaction chamber at 12. The $CO_2$ is then deodorized in a purifier 23 from which it is drawn by a fan or compressor 24 to a gas holder 25. From this chamber the gas flows through the heat-exchanger 4 where it is pre-cooled by the $SO_2$ from the evaporator and then passes to the liquefaction plant. Preferably the pre-cooled $CO_2$ is mixed with $CO_2$ returning from the dry-ice machine, is alternately compressed and cooled and conveyed through the condenser 3 to be liquefied or solidified as illustrated.

In the production of bisulphite liquor the absorption of 500 pounds of $SO_2$ liberates substantially 165 pounds of $CO_2$ which normally goes to waste and the present method of utilizing the latent heat of vaporization of the $SO_2$ affords a ready method of recovering this $CO_2$ and more economically producing the bisulphite liquor.

The stand-pipe 17 is preferably open at the top to permit the escape of any $CO_2$ carried by and freed from the acid. If very strong acid liquor is being made, it may be necessary to connect this outlet of the stand-pipe with a washer to recover $SO_2$ which may escape and which would otherwise be lost. The ratio between combined and free $SO_2$ in the liquor will be regulated by the amount of gas admitted to the reaction chamber in relation to the water admitted with the powdered limestone.

By the use of the heater 5 the temperature of the evaporated $SO_2$ is maintained as required for greatest efficiency in the acid reaction and enables compensation to be made for varying atmospheric temperature conditions in changing seasons.

What I claim is:

1. In the production of bisulphite liquor and cooling of carbon dioxide preliminary to liquefaction or solidification of the latter, the process which comprises providing an aqueous slurry of limestone, allowing liquid sulphur dioxide to evaporate in heat exchange relationship with the carbon dioxide resulting from the decomposition of said limestone by means of gaseous sulphur dioxide and reacting the gaseous sulphur dioxide resulting from such evaporation with the slurry of limestone.

2. In the production of bisulphite liquor and condensation of carbon dioxide produced therein, the process which comprises providing an aqueous slurry of limestone, allowing liquid sulphur dioxide to evaporate in repeated heat exchange relationship with the carbon dioxide resulting from the decomposition of said limestone by reaction with gaseous sulphur dioxide and causing the gaseous sulphur dioxide resulting from such evaporation to react with said slurry of limestone.

3. A process as defined in claim 1, wherein the carbon dioxide resulting from said decomposition is washed with water and then deodorized before being brought into heat exchange relationship with said sulphur dioxide.

4. A process as defined in claim 1, wherein the temperature of the evaporated sulphur dioxide is regulated to compensate for atmospheric temperature changes and to maintain in the gas the most efficient temperature for reaction with the limestone.

5. A process as defined in claim 1, wherein the reaction of the sulphur dioxide with the limestone is effected in a downwardly tapered reaction zone, adjacent the bottom of which the sulphur dioxide is admitted to insure maximum combination of sulphur dioxide and release of carbon dioxide.

6. A process as defined in claim 1, wherein the carbon dioxide resulting from said decomposition of the limestone is washed with water and wherein said wash water is incorporated with powdered limestone to form said slurry.

SIGMUND WANG.